United States Patent [19]

Turner

[11] Patent Number: 5,391,245
[45] Date of Patent: Feb. 21, 1995

[54] FIRE-RESISTANT BUILDING COMPONENT

[76] Inventor: Terry A. Turner, 5778 N. Adams Dr., Madras, Oreg. 97741

[21] Appl. No.: 948,303

[22] Filed: Sep. 21, 1992

[51] Int. Cl.⁶ .............................................. B29C 39/02
[52] U.S. Cl. .......................................... 156/39; 156/42; 156/43; 156/45; 106/602; 106/606; 106/607; 106/675; 106/681; 106/698; 106/706; 106/709; 106/713; 52/232
[58] Field of Search .................... 156/39, 42, 43, 45; 106/18.12, 602, 606, 607, 675, 681, 698, 706, 709, 713; 52/232

[56] References Cited

U.S. PATENT DOCUMENTS

| | | |
|---|---|---|
| 889,569 | 6/1908 | Albrecht . |
| 1,309,038 | 7/1919 | Light . |
| 1,309,296 | 7/1919 | Marks . |
| 1,484,370 | 2/1924 | Bartlett . |
| 2,057,330 | 10/1936 | Elchert . |
| 2,377,484 | 6/1945 | Elmendorf . |
| 2,592,345 | 4/1952 | Schnell et al. . |
| 2,787,345 | 4/1957 | Soubier et al. ............... 52/232 |
| 2,899,325 | 8/1959 | Kranz et al. . |
| 3,219,467 | 11/1965 | Redican et al. . |
| 3,264,125 | 8/1966 | Bourlin . |
| 3,311,483 | 3/1967 | Garnier et al. . |
| 3,403,205 | 9/1968 | Ottenholm . |
| 3,438,853 | 4/1969 | Haines, Jr. et al. . |
| 3,502,490 | 3/1970 | Ware . |
| 3,705,837 | 12/1972 | Breslauer . |
| 3,753,749 | 8/1973 | Nutt . |
| 3,854,985 | 12/1974 | Suzuki et al. . |
| 3,873,351 | 3/1975 | Ueda et al. . |
| 3,901,991 | 8/1975 | Ueda et al. . |
| 3,987,600 | 10/1976 | Baehr ............................ 52/232 |
| 4,040,851 | 8/1977 | Ziegler . |
| 4,047,962 | 9/1977 | Copeland . |
| 4,075,804 | 2/1978 | Zimmerman ................. 52/232 |
| 4,101,335 | 7/1978 | Barrable . |
| 4,131,638 | 12/1978 | Whitaker et al. . |
| 4,132,555 | 1/1979 | Barrable . |
| 4,268,317 | 5/1981 | Rayl . |
| 4,308,068 | 12/1981 | Copling . |
| 4,308,070 | 12/1981 | Cavicchio . |
| 4,363,878 | 12/1982 | Yamamoto et al. . |
| 4,373,957 | 2/1983 | Pedersen . |
| 4,402,751 | 9/1983 | Wilde . |
| 4,406,703 | 9/1983 | Guthrie et al. . |
| 4,497,662 | 2/1985 | Chisholm et al. . |
| 4,746,555 | 5/1988 | Luckanuck .................. 106/602 |
| 4,799,961 | 1/1989 | Friberg . |

OTHER PUBLICATIONS

The Chemistry of Cement and Concrete, F. M. Lee, London (1956), pp. 505–506.

Primary Examiner—Caleb Weston
Attorney, Agent, or Firm—Kolisch, Hartwell, Dickinson, McCormack & Heuser

[57] ABSTRACT

A method of, and compositions for, the making of a fire-resistant door core assembly. Doors produced from the door core assemblies. In the making of a door core assembly, an aqueous slurry containing gypsum cement and diatomaceous earth is prepared. The slurry may also include expanded mineral ore material and Portland cement. The slurry preliminarily hardens during a green cure stage.

13 Claims, 2 Drawing Sheets

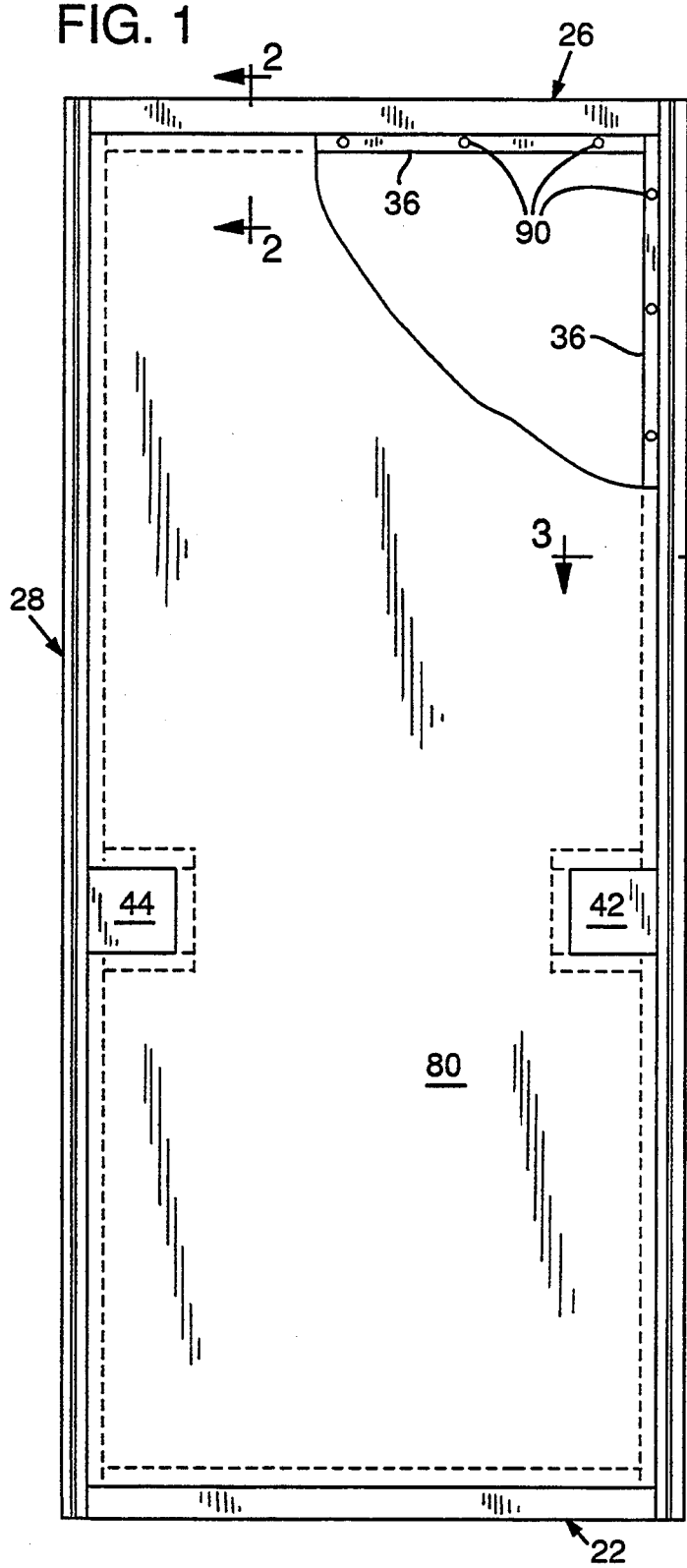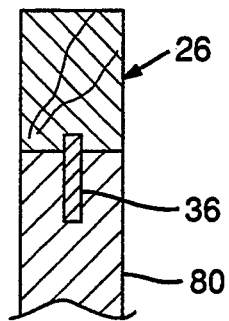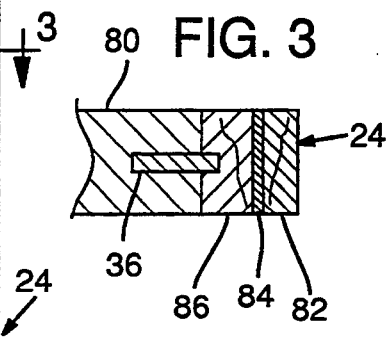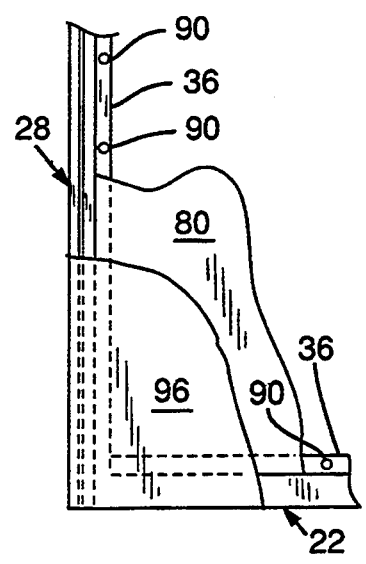

FIRE-RESISTANT BUILDING COMPONENT

BACKGROUND OF THE INVENTION

This invention relates to the manufacture of a building product, such as a panel, and more particularly to the manufacture of such a product where the product includes a slab of hardened material produced from an aqueous flowable slurry. The invention further concerns the production of a fire-resistant panel product, and novel slurry compositions from which the panel may be produced.

In recent years, a considerable market has developed for fire-resistant doors capable of withstanding severe test procedures for a favorable fire rating to be obtained. Featured herein, and described with more particularity hereinbelow, are methods and compositions usable in the manufacture of fire-resistant door core assemblies, and doors produced from these core assemblies.

SUMMARY OF THE INVENTION

A general object of the invention, therefore, is to provide a novel panel product, having requisite strength, but nevertheless possessing exceptional fire-resistant properties.

Another object is to provide novel compositions usable in the production of a fire-resistant panel or other building products.

According to the present invention, an aqueous slurry is prepared from solid particulate material and water. The slurry is spreadable within a mold to produce a layer of material, which on hardening forms a slab. This slab may be sanded and otherwise treated to produce the final product contemplated. An object and feature of the invention is the provision of a slurry composition exhibiting what is referred to herein as a green curing capability, which results in an initial hardening of the slurry into slab form relatively quickly after layering out of the slurry. The initially hardened slab has sufficient strength to enable the slab to be transported and otherwise handled at an early stage in the manufacture of the panel product.

Another object of the invention is to provide compositions for the production of fire-resistant building products, such as a panel or a door core, featuring significant amounts of gypsum cement and diatomaceous earth as solid ingredients in the slurry. The compositions contemplated undergo a so-called green cure soon after being spread out in layered form. Furthermore, the combination of the gypsum ingredient and diatomaceous earth ingredient combine to provide excellent fire-resistant properties to any panel produced from the slurry.

A still further object of the invention is to provide a novel method of making a panel product, such as a door core assembly, wherein elongate frame members are utilized to prepare a frame, and a hardenable slurry is layered out within the confines of this frame utilizing the frame as a mold for the slurry. With hardening of the slurry, the slab that results together with the bounding frame members form a unitary member or product. The member is usable as a door core assembly in the manufacture of a door. To produce the door, coverings of facing material are applied to opposite sides of the door core assembly. The elongate frame members making up the original frame become edge banding strips in the final door produced.

In the production of a door core assembly and door in the manner briefly above-described, the frame members which form the frame may be provided with splines extending along their interior sides. With layering of the slurry within the region bounded by the frame members, the slurry material works over opposite sides of the splines discussed. In this way, a door core assembly is produced with enhanced strength properties.

These and other objects and advantages are attained by the invention, which is described hereinbelow in conjunction with the accompanying drawings, wherein:

BRIEF DESCRIPTION OF THE DRAWINGS

FIG. 1 is a view looking at the side of a door core assembly such as may be produced following the invention, portions of a core slab in the assembly having been broken away in the drawing;

FIG. 2 is a cross-sectional view, taken generally along the line 2—2 in FIG. 1;

FIG. 3 is a cross-sectional view, taken generally along the line 3—3 in FIG. 1;

FIG. 4 illustrates portions of a completed door;

DETAILED DESCRIPTION OF THE PREFERRED EMBODIMENT

Figure 5:
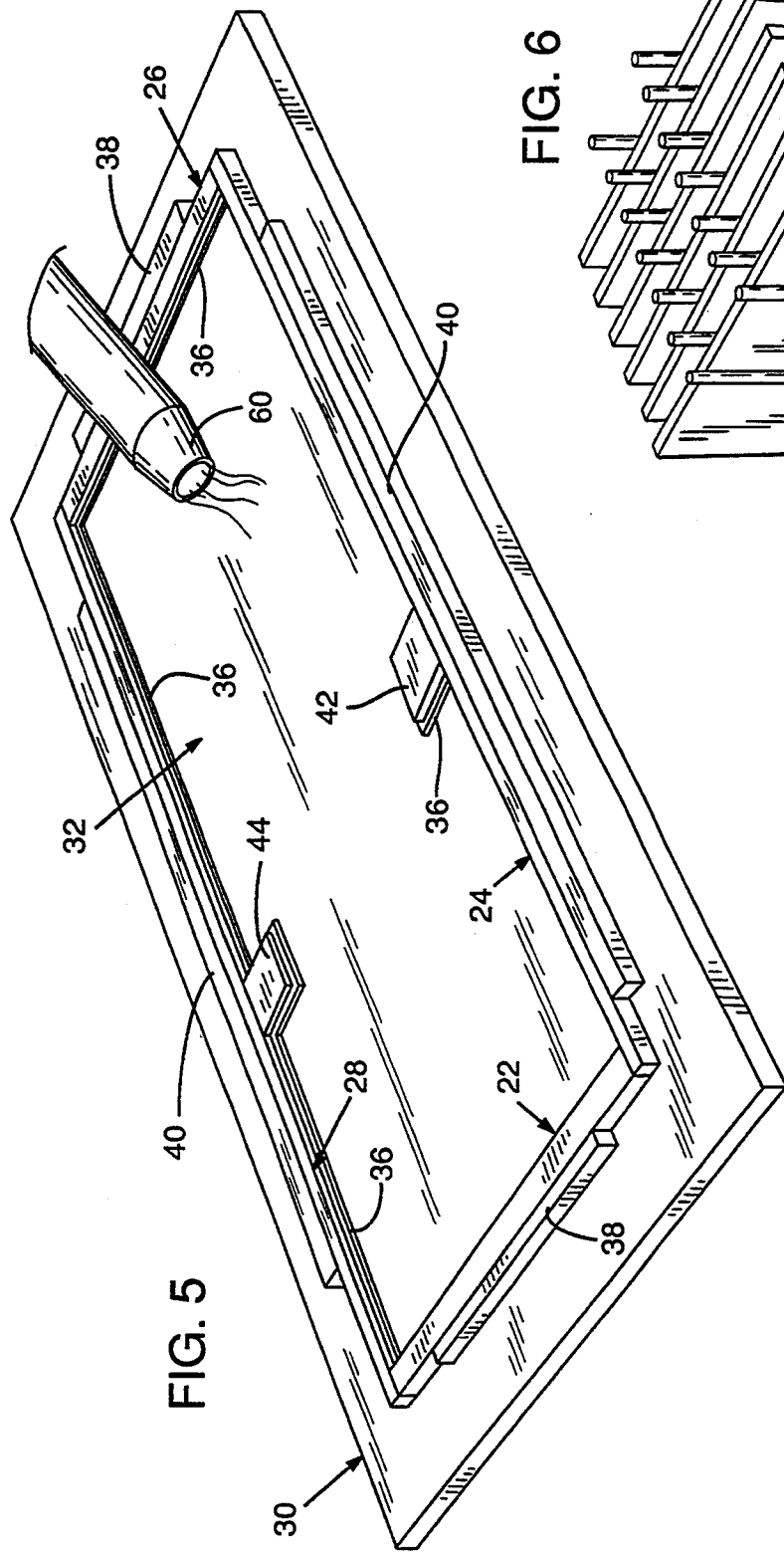
FIG. 5 is a perspective view, illustrating in simplified, diagrammatic fashion how a layer of material may be layered out within the confines of a frame as a step in the manufacture of a door core assembly pursuant to the invention.

The invention is hereinafter described as practice in connection with the manufacture of a door core assembly usable in the manufacture of a fire-resistant door.

A door core assembly as contemplated herein includes a core slab prepared from an aqueous slurry of water and fire-resistant particulate material, which, after layering out, solidifies to form the core slab. Also part of the core assembly are edge band strips or elements extending in a rectangular course and bounding the perimeter of the core slab.

Describing with more particularity the aqueous slurry, and how such may be prepared, the slurry, in addition to water, includes a fraction of what is referred to herein as a particulate siliceous material, and a fraction of what is referred to herein as particulate inorganic cementitious material. The slurry may additionally include, as part of the solids in the slurry mix, a minor proportion of fiber material distributed in the slurry and contributing strength.

The particulate siliceous material, which ordinary may constitute from 35% to 60% by weight of the solids in the slurry, may comprise a diatomite, as exemplified by diatomaceous earth, and a particulate expanded mineral ore material.

Diatomaceous earth is a light, friable, siliceous material, derived from siliceous remains of diatoms. There are abundant supplies of the material in certain regions of the United States, and thus the material is available at relatively low cost. The material is light in weight, is non-flammable and has excellent insulating properties. Traditionally, diatomaceous earth exhibits a hydrophilic property, in that it readily absorbs and holds water, in effect to impart a drying characteristic to slurries containing the material.

The particulate expanded mineral ore material, as the term is used herein, refers to expanded material produced from heating ores or clays, such as expanded mica, known in the art as vermiculite, or expanded ore materials, such as volcanic rock and pumice aggregate, including expanded hydrosilicate ores, exemplified by what is known in the art as perlite. These expanded materials have a relatively low density, are non-combustible and have good insulating properties. Perlite or vermiculite granules retain moisture, which further aids in the setting of compositions containing the ingredients.

In most instances, the expanded mineral ore material, on a weight basis, will range from about ⅓ to ⅔ of the weight of the diatomaceous earth present in the mixture.

The inorganic cementitious material ordinarily comprises from 35% to 60% by weight of the solids in the slurry compositions. In the usual instance, a mix of Portland cement and gypsum cement (plaster of paris) are used as the cementitious material. The presence of Portland cement in the solids mix contributes strength to panel products produced. The use of Portland cement alone, however, is not preferred, since this tends to result in long setting times in the slurries prepared. By including gypsum cement, reduced setting times in the mixtures result. In the slurries of the invention, ordinarily Portland cement constitutes from about 1/5 to ½ by weight of the amount of gypsum cement present in the slurry.

The gypsum cement in combination with the diatomaceous earth imparts an early green cure or preset to the panel product produced. Gypsum cement hydrates during the production of a panel product from the slurry, with binding of water within the compound. It is felt that an advantage of the products of the invention is the release of such water during exposure to high temperature, to impart increased fire-resistant properties.

The aqueous slurry compositions of the invention, in addition to the materials discussed above, may include a minor amount of polyvinyl acetate (a binder material), and a minor amount of a fiberglass strand material. Where polyvinyl acetate is included, such normally does not exceed 5% by weight of the solids in the slurry mix. The fiberglass strand material ordinarily does not exceed about 0.5% by weight of the solids in the mix. The fiberglass strand material is included to add slightly increased strength properties. The strands typically might have an average length ranging from about 0.5 to 1.5 inch, and an average diameter of 0.001 inch. The fiberglass material is non-flammable, and the fibers in the final slab produced extend randomly to add strength.

If a retarder is desired to aid in controlling the setting up time of the slurries, retarders for the setting of the gypsum cement suggest themselves, such as dried animal blood, or citric acid. Where a retarder is employed, normally it constitutes no more than about 0.5% by weight of the solids in the mix.

In the making of a slurry utilizable in the manufacture of a door core assembly, the gypsum cement and Portland cement, i.e. the siliceous, cementitious material, may be mixed together dry, and then hydrated with the addition of water. The particulate siliceous material, i.e. the perlite and diatomaceous earth, together with any fiber material, may be mixed in a separate container, together with the addition of water. The two water mixtures may then be introduced to each other, and then mixed, and then polyvinyl acetate and retarder introduced if these ingredients are further included.

A final slurry so prepared will exhibit a preset or green cure, when layered out as a layer of from 1 to 3 inch thickness, of from 30 minutes to approximately an hour. The hardened slab that results from the layered slurry, as a result of this green cure, is susceptible to reasonable handling without damage such as lifting, transport, etc., as might occur in the manufacture of a product form the slurry.

In the making of a panel, such as a door core assembly, the assembly may include elongate edge band strips or elements secured end-to-end and forming a rectangular frame extending about the perimeter and bounding a core slab in the door core assembly. In a completed door, facing sheet material (for example veneer sheet material) may be applied over the faces of a core assembly, to cover the core slab in the assembly as well as the edge band strips which extend about the perimeter of the core slab. The edge band strips may be made of fire-resistant treated lumber, or may be laminar products including a lamination of fire-retardant lumber and/or other fire-retardant materials, such as fire-resistant hardboard materials which are commercially available.

In the usual slurries that are prepared, the solids will make up from 35% to 65% by weight of the slurry, with the remainder of the slurry being water.

It has been found convenient following the invention to prepare a rectangular frame of fire-resistant members where the fire resistant members extend in a rectangular course in the frame and are secured together at adjacent ends. This frame, as described, bounds an interior void region. The aqueous hardenable slurry that is prepared is poured into the interior void region bounded by the frame, with the frame then functioning as a mold confining the perimeter of the slurry. The slurry hardens as a slab within the frame, with the hardened slab and frame then becoming a unitary member. This member, after further processing, such as sanding of opposite faces, becomes the core assembly of a door. The frame members become edge band strips in the door core assembly.

Describing a particular manufacture, elongate frame members were prepared, as exemplified by members 22, 24, 26 and 28 shown in FIG. 5. The frame members were laid down on a horizontal support, as illustrated by the support shown at 30 in FIG. 5. The frame members, as shown in FIG. 5, were arranged to extend in a rectangular course. Adjacent overlapping ends of frame members were suitable secured to each other.

The frame so-produced bounded the perimeter of an interior void region 32. The bottom of this void region was bounded by the top of support 30. The frame members were provided with spline elements 36 suitably mounted with margins embedded into the inner edges of the frame members. The spline elements were located midway between top and bottom surfaces of the respective frame members.

The frame members were suitable braced and anchored on the support to prevent them from being deformed, as by bowing outwardly, with a slurry mixture introduced into void region 32. In FIG. 5, this bracing has been shown schematically by brace portions 38, 40 joined to the support 30 and abutting outer edges of the frame members. The brace portions are exemplary only of different types of bracing systems that could be employed.

In addition to the spline elements, block pieces 42, 44 were provided joined to and projecting inwardly from frame members 24, 28 extending along the long dimension of the frame. In a completed door, these block elements are used in mounting hardware associated with a mounted door.

An aqueous slurry was prepared by mixing together, in one vessel, 100 parts diatomaceous earth and 52 parts perlite (parts described herein are on a by weight basis). After mixing the described ingredients in dry form, 275 parts of water were added, and the contents of the vessel further mixed. To this mixture 1.3 parts of fiberglass strands of 1 inch average length were then added and mixed.

In another vessel, 130 parts gypsum cement and 31 parts Portland cement were dry mixed together. To this dry mixture, 98 parts water were then added, and mixing continued.

The mixture of gypsum cement, Portland cement and water was then introduced to the mixture of diatomaceous earth, fiber and perlite, and the two mixtures blended together. To the resulting mix, 12 parts polyvinyl acetate and ½ part retarder were added.

A mixture so prepared was introduced to the interior void region 32 bounded by the frame members described in connection with FIG. 5 as by using a nozzle, exemplified by the nozzle shown at 60 in FIG. 5. Sufficient slurry was introduced to completely fill the void region. The slurry spread to extend under and over the exposed portions of the spline elements 36. The slurry introduced was leveled off at the level of the top of the frame members defining void region 32. If desired, vibration may be imparted to the support 30 to promote distribution of the slurry within the void region.

In the preparation thus described, a slurry layer equalling the thickness of the frame members was prepared in the space bounded by the frame members, this layer being approximately 1 and ½ inch deep. After approximately 30 minutes, a hardened slab resulted, of sufficient strength to enable the slab and the frame members surrounding it to be removed and transported away from support 30.

Figure 6:
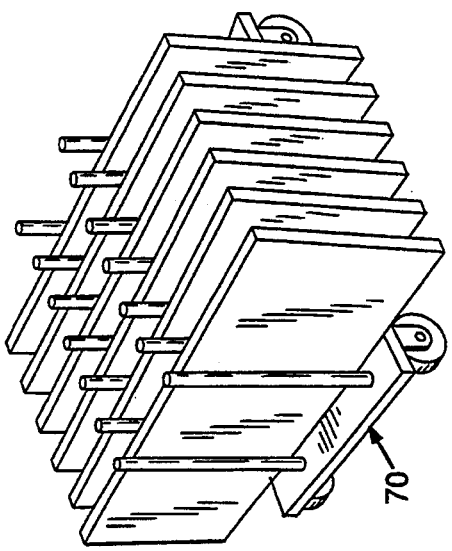
FIG. 6 is a simplified, diagrammatic showing, illustrating how door core assemblies after pouring of the slurry and after a preliminary green cure stage, may be transferred to a rack prior to additional curing taking place.
Figure 7:
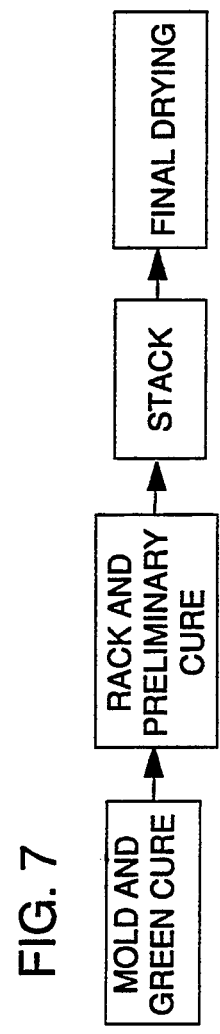
FIG. 7 is a block diagram illustrating various stages in the manufacture of a door core assembly.

After molding and green curing of the slurry to form the slab, the slab together with its encompassing frame was removed and placed on a rack, as exemplified by the rack shown at 70 in FIG. 6. While supported on the rack, the assembly, together with other assemblies like it, were transported to a curing room, and in this curing room subjected to curing at 120° F. for approximately 12 hours. This illustrates racking and preliminary curing of the slab and frame assembly.

After this step, the slabs with their encompassing flames are removed from the racks and arranged horizontally in stacks or piles, with stickers provided between adjacent assemblies to provide for air flow. The various assemblies are then allowed to dry for approximately 5 days at ambient temperature, as for instance 70° F. Air drying produces final curing of the slurry slabs.

After air drying of the core assemblies, with final curing of the core slabs within them, the core assemblies may be processed to prepare them for receiving facing sheet material, such as face veneers, and the manufacture of final doors. Thus, the core assemblies may be run through sanders which sand the faces and edge band strips to required exact thicknesses. Further, the assemblies may be passed through a sizing station, where sizing material is applied to opposite faces.

FIGS 1, 2 and 3 illustrate a core assembly as produced using the compositions and process of the invention. In the core assembly illustrated, a core slab produced from a slurry as described herein is shown at 80. Frame members 22, 24, 26, 28 bound the core slab, and in the core assembly these frame members constitute edge band strips.

Edge band strips 22, 26 at opposite ends of the door may be cut from a solid piece of fire-resistant material. They are then grooved to have spline elements 36 mounted on their inner edges. The frame members or edge band strips 24, 28 may be cut from a laminated product made up of laminations of fire-resistant material. Thus, as exemplified by edge band strip 24, the outer edge of the strip may be a layer of fire-resistant wood material, as indicated at 82. The next layer, shown at 84, may be a fire-resistant material selected to provide, screw or fastener retention. The inner layer 86 of fire-retardant material may be selected for a characteristic such as enhanced strength or fire-resistant properties.

Spline elements 36, in those regions which are exposed along the inner edges of the edge band strips, may be provided with holes or perforations 90. During layering out of the slurry to form the core slab, the slurry enters these perforations, and on hardening, a keying, in effect, occurs between the core slab and the spline elements. In the manufacture of the door, and as illustrated by the position of the door shown in FIG. 4, facing sheet material, such as the face veneer shown at 96, may be applied, as with adhesive, over opposite faces of the core assembly to complete the door.

Doors with door core assemblies produced as described have been tested for fire-resistant and strength under the most severe of conditions. Excellent fire ratings were obtained.

The weight of a core assembly produced as outlined is not appreciable. For instance, a typical core assembly might be expected to have a density of approximately 30 pounds per cubic foot. This imparts to the finished door a weight which is comparable to the weight of a regular solid core door without fire-resistant properties.

It should be noted that core assemblies are producibly following the invention without the need of boiling or other expensive processing of the slurry used in making the core slabs. This is very important in reducing the amount and complexity of the equipment needed for the manufacture of the slurry, and the time and man-hour supervision required in the slurry manufacture.

It should also be noted that no application of pressure is required in the manufacture of a core slab. In the past, the application of pressure has been relied upon to facilitate removal of water from a wet slurry, or for other reasons. The use of pressure applied, for instance, to the wet slurry, adds to the expense of making a door core assembly. Furthermore, it tends to result in a door core assembly of appreciable weight.

The slurry compositions as described herein exhibit the capability of green curing at an early stage in the manufacturing process, with the green cure established in a layered slurry enabling the slab produced from the slurry to be subjected to limited handling. This is a very important feature, and is felt to result to a large extent from the combination of the gypsum cement and diatomaceous earth utilized as major constituents of the slurry mixture.

By preparing a frame for receiving the wet slurry of members which become edge band strips in the completed core assembly, certain manufacturing steps are eliminated in the manufacture of a door core assembly. By indicating a preferred method of manufacture, however, it is not intended to exclude from the coverage of the invention door cores produced with edge band strips applied after preparation of the core slabs.

While the present invention has been shown and described with reference to the foregoing preferred embodiment, it will be apparent to those skilled in the art that other charges in form and detail may be made therein without departing from the spirit and scope of the invention as defined in the appended claims.

I claim:

1. A method of preparing a fire-resistant panel comprising:
   preparing an aqueous slurry of fire-resistant particulate material and water with the slurry being spreadable in a mold to produce a layer of slurry, the slurry being prepared with a major portion of the particulate material consisting of gypsum cement and diatomaceous earth whereby the slurry is hardenable in a green cure stage to permit handling,
   spreading the slurry in a mold and forming a layer of the slurry within the mold,
   permitting the slurry to .harden during a green cure stage and with such hardening to form a slab from the slurry, and then permitting the slab to finally cure and harden to produce the panel.

2. The method of claim 1, wherein the slurry is prepared, spread and subjected to a green cure stage to form the slab without cooking of the slurry and without pressure applied to the spread slurry.

3. The method of claim 2, wherein the mold is prepared from elongate frame members bounding a void region, and the slurry is spread in the void region bounded by the frame members and hardens to form a slab bounded by the frame members, and the slab and frame members are covered by facing sheet material to prepare the final panel.

4. In the manufacture of a panel, the method comprising:
   preparing an aqueous slurry having a solids content composed of a particulate siliceous material and a particulate inorganic cementitious material, the cementitious material including gypsum cement and the siliceous material including diatomaceous earth,
   layering out the slurry as a layer on a horizontal support surface and permitting the layer without compression-removal of water to harden during a green cure stage to form a slab, and
   after hardening during a green cure stage, transporting the slab and permitting the transported slab to additionally harden during an additional curing stage.

5. The method of claim 4, wherein a rectangular frame having frame members extending in a rectangular course and bounding an interior void region with the frame being open on one side is prepared, the frame is placed on a support with the open side facing upwardly, and layering out the slurry is performed by introducing the slurry to the interior void region bounded by the frame through the frame's upwardly facing side.

6. The method of claim 5, wherein the frame is prepared with spline elements extending inwardly from the frame members into the interior void region bounded by the frame, and layering of the slurry is performed with the slurry moving to opposite sides of said spline elements.

7. The method of claim 5, wherein the frame members are composed for fire-resistant material.

8. The method of claim 7, wherein after said additional curing stage, facing sheet material is applied to opposite sides of the hardened slab produced, and the facing sheet material extends over the slab and in addition over the rectangular frame which surrounds the slab.

9. A method of making a door core assembly comprising:
   preparing a rectangular frame of fire-resistant members extending in a rectangular course and the frame bounding an interior void region,
   preparing an aqueous hardenable slurry of fire-resistant solid materials,
   introducing the slurry to the interior void region bounded by said frame, and with the frame functioning as a mold confining the slurry, permitting the slurry to harden while occupying the interior void region, the hardened slurry and frame then becoming a unitary member, and
   applying facing sheet material to each of opposite sides of this unitary member with the material covering the hardened slurry and the frame which bounds the hardened slurry.

10. The method of claim 9, wherein the frame is prepared with spline portions projecting into the interior void region bounded by the frame, and wherein with introducing of the slurry, the slurry is caused to flow and to move over opposite sides of the spline portions.

11. The method of claim 9, wherein the frame is deposited on a fiat support surface, with the support surface and frame together providing a mold cavity for receiving slurry, and the slurry is introduced to the interior void region by filling said mold cavity.

12. The method of claim 11, wherein after the slurry is introduced to the mold cavity, the frame and surface are subjected to a vibrating action serving to distribute the slurry within the mold cavity.

13. The method of claim 11, and which further comprises anchoring the frame to the support surface prior to introducing the slurry to said cavity.

* * * * *